United States Patent [19]
Unger, Jr.

[11] Patent Number: 6,056,356
[45] Date of Patent: May 2, 2000

[54] CYCLE SEAT

[76] Inventor: Joseph F. Unger, Jr., 808 Atalanta Ave., Saint Louis, Mo. 63119-2077

[21] Appl. No.: 09/135,113

[22] Filed: Aug. 17, 1998

[51] Int. Cl.[7] .......................................................... B62J 1/00
[52] U.S. Cl. .................. 297/201; 297/195.1; 297/215.15
[58] Field of Search ................................ 297/195.1, 201, 297/215.13, 215.15, 312

[56] References Cited

U.S. PATENT DOCUMENTS

| | | | |
|---|---|---|---|
| 608,682 | 8/1898 | Jamieson | 297/201 |
| 621,139 | 3/1899 | Reuter | 297/312 |
| 4,387,925 | 6/1983 | Barker et al. | |
| 4,877,286 | 10/1989 | Hobson et al. | 297/201 |
| 5,123,698 | 6/1992 | Hodges | 297/201 |
| 5,286,082 | 2/1994 | Hanson | 297/195.1 X |
| 5,352,016 | 10/1994 | Hobson. | |
| 5,709,430 | 1/1998 | Peters | 297/201 |
| 5,911,474 | 6/1999 | Lee | 297/201 |

OTHER PUBLICATIONS

Brochure entitled "The Hobson Adjustable Saddle" (publication date unknown).

JB TWO Corporation Instruction Sheet for the "EASY-SEAT" (publication date unknown).

ABS Sports Electronic Advertisement for "The Dual Action Seat", printed from the Worldwide Web on Mar. 29, 1998 (publication date unknown).

*Primary Examiner*—Peter R. Brown
*Attorney, Agent, or Firm*—Hovey, Williams, Timmons & Collins

[57] ABSTRACT

A bicycle (32) includes a seat (20) having a support stem (22), a roller bearing support member (24), a flexible support arm (26), a pair of pivot joints (28), and a pair of seat members (30). The pivot joints (28) comprise ball and socket joints which allow the seat members to pivot about respective sets of axes (X',Y',Z' or X",Y",Z"). Further pivoting motion is provided by the roller bearing support member (24), flexible support arm (26), and by allowing the support arm (26) to pivot. The pivoting motion of the seat members (30) permits the proper range of motion in the rider's (34) sacroiliac joint (D, E) to maintain the flow of CSF in the rider's neurological anatomy thereby enhancing strength and stamina.

19 Claims, 2 Drawing Sheets

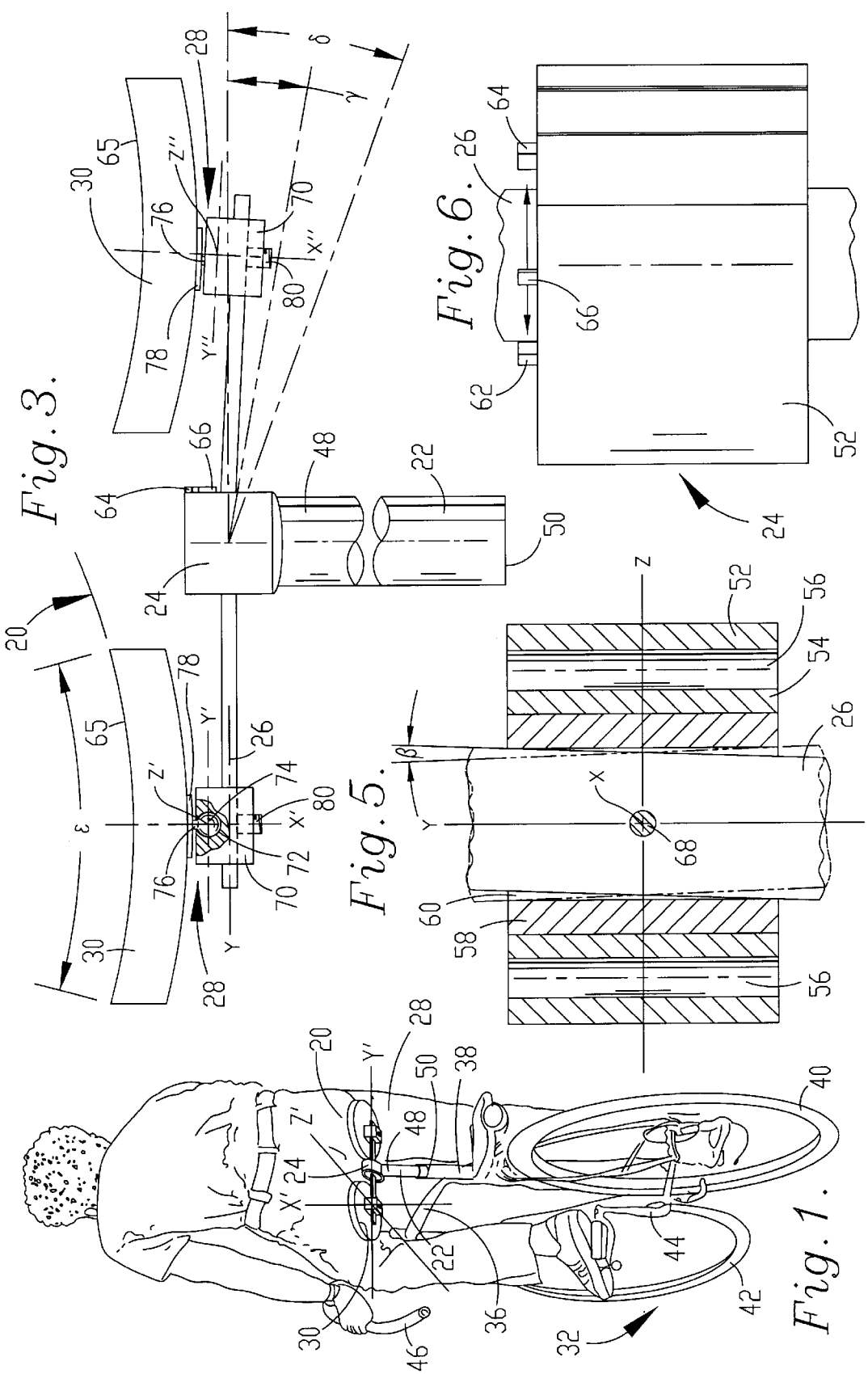

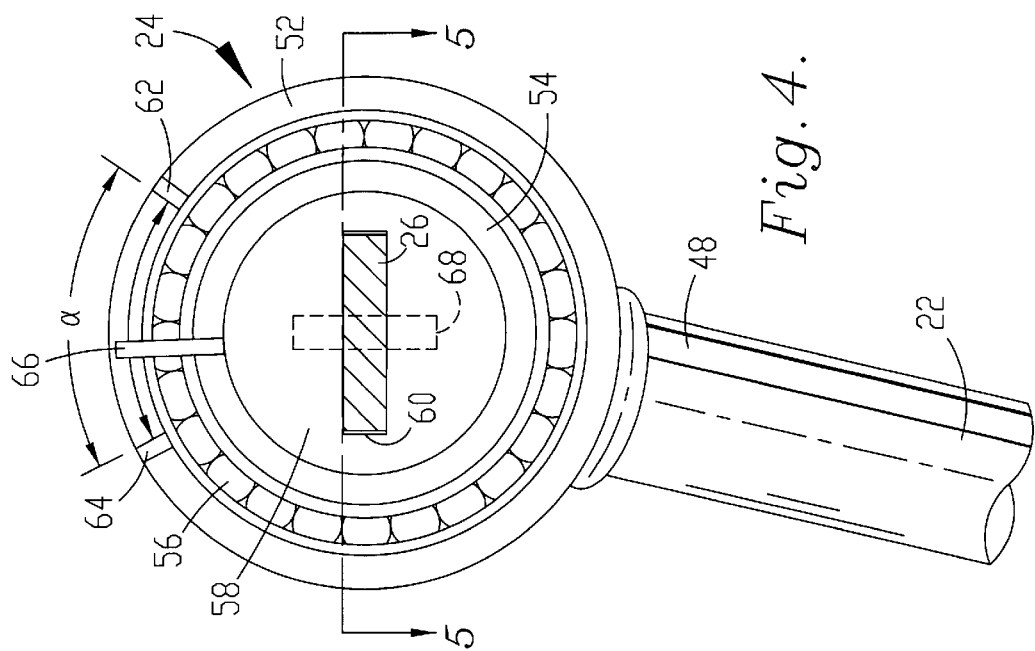
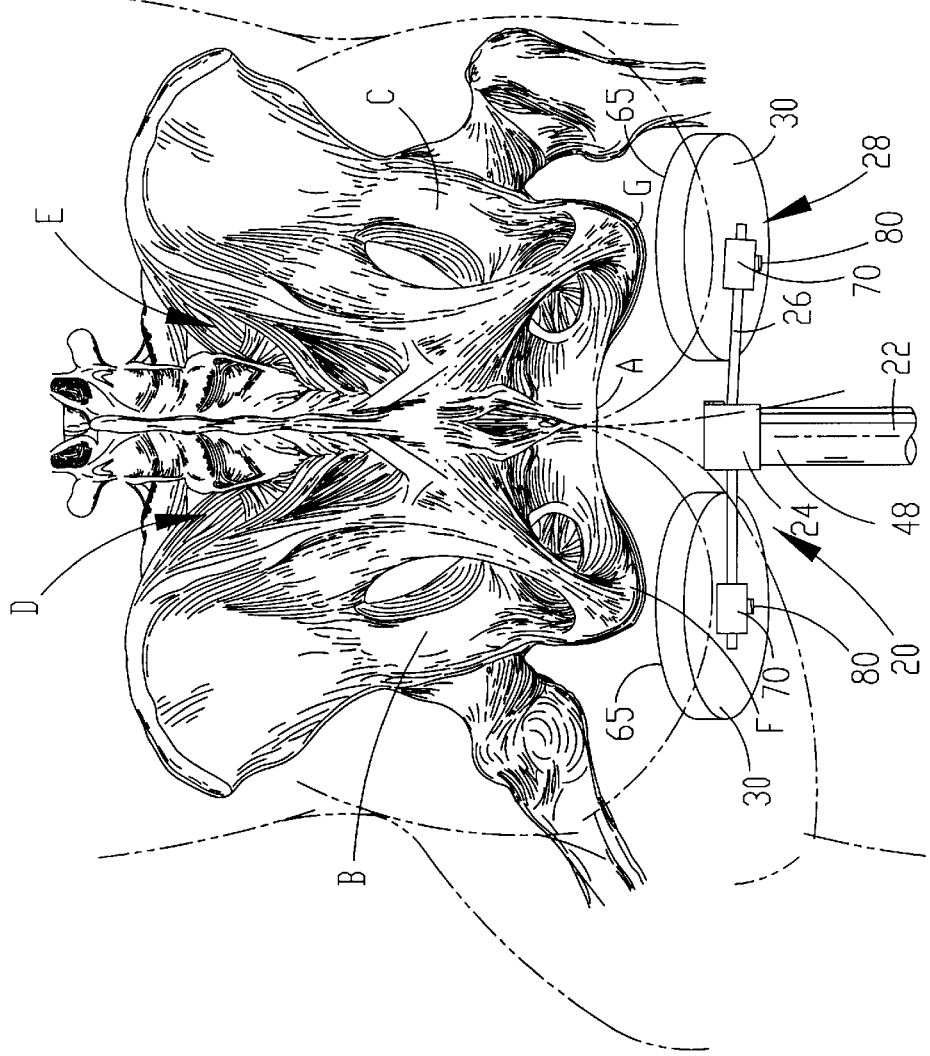
Fig. 4.
Fig. 2.

CYCLE SEAT

BACKGROUND OF THE INVENTION

This invention relates to seats and, more particularly, to bicycle seats which support riders with two separate support surfaces.

Since the invention of the first bicycle, riders 34 (FIG. 2) have zealously sought after more comfortable seats. The conventional bicycle seat includes an elongated and narrow horn which wedges into the pubic arch A of the rider and forces the riders' left and right hip bones B, C apart. This wedging action of the conventional bicycle seat has substantial deleterious effects on the human anatomy.

The nervous system, which controls muscle function and blood flow throughout the body as well as in the pelvic and leg region, depends on the circulation of cerebrospinal fluid (CSF) around and through the brain and spinal cord for optimal operation. It is believed that proper circulation of CSF is in part achieved by the precise movement of the pelvic structure and spine including reciprocating movement of the sacroiliac joint D, E which pumps CSF throughout the neurological anatomy. Unfortunately, conventional seats inhibit the movement of the sacroiliac joint D, E because forcing the hip bones apart impinges on the sacroiliac joint D, E.

For optimal performance of anyone engaged in an athletic activity, it is essential that the proper amount of motion be allowed in the sacroiliac joint. It is equally important that minimum and maximum amounts of movement not be exceeded because either too much or too little motion in the sacroiliac joint can interfere with proper CSF flow. Inhibition of the appropriate motion, thus impedes the optimal CSF flow resulting in reduced neurological function. In some cases, the loss of optimal neurological function can lead to loss of strength and stamina and cause discomfort.

Recent studies have also linked conventional bicycle seats with impotency in males. When the sacrum and coccyx are impinged upon, the operation of the vital nerves in the lumbar spine can be inhibited and in some cases contribute to impotency. Further, the pudendal nerve is positioned in the pelvis, so that it can be directly compressed by conventional bicycle seats. Therefore, the male rider experiences discomfort, and the sensitivity of the male genitalia is inhibited.

Recent designs have bifurcated the seat to support riders with two support surfaces on the riders' ischial tuberosities F, G (FIG. 2). This is desirable because the ischial tuberosities are particularly designed for supporting the rider. Some of these designs even permit the support surface to move in a limited fashion. However, even these designs fail to fully appreciate the complexity of human anatomy allowing too much motion in some directions and restricting all motion in other directions.

Thus, it is desirable to provide a bicycle seat which supports the rider on the ischial tuberosities to prevent impingement on the pudendal nerve thereby reducing discomfort. It is further desirable to provide a bicycle seat which allows the appropriate range of motion in all directions to enhance the operation of the sacroiliac joint and the flow of CSF throughout the neurological anatomy. Enhancements in the flow of CSF increases strength, stamina, and reduces discomfort. Further, proper operation of the sacroiliac joint reduces the occurrence of impotency among bike male riders.

BRIEF SUMMARY OF THE INVENTION

There is, therefore, provided in the practice of the invention a novel cycle seat for supporting a rider on the rider's ischial tuberosities while allowing for proper range of motion of the rider's sacroiliac joint to maintain desired CSF circulation through the rider's neurological anatomy whereby strength and stamina are increased, discomfort is minimized, and the occurrences of impotency are reduced. The seat includes a rigid support stem with a support arm joined to an upper end thereof. At least one seat member is connected to the support arm by a pivot joint which allows the seat member to pivot about three axes.

In a preferred embodiment, the cycle seat also includes a roller bearing support member attached to the upper end of the stem with the support arm extending therethrough. Thus, the support member is allowed to pivot. Preferably, stops are attached to an outer bearing ring of the support member and a stop pin is attached to the inner bearing ring between the stops to limit the pivot of the support arm to 60°.

The support member preferably defines a support arm receiving aperture having the support arm received therein, and a pivot pin pivotally connects the support arm within the receiving aperture which is sized to allow the support arm to pivot approximately 4° relative to the support member. The support arm is preferably flexible along its length to permit elastic deformation less than approximately 20°.

A second seat member is also provided, and the two seat members are positioned on opposite sides of the support stem. The seat members are slidably connected to the support arm for sliding along a length of the support arm whereby the seat is adjusted for different sized riders. Each of the seat members is preferably biased toward a substantially horizontal position.

The pivot joint preferably comprises a ball and socket joint. The pivot joint allows the seat member to pivot by approximately 2° about each of the three axes.

There is further provided in the practice of the invention a novel bicycle including a frame, at least one wheel rotatably mounted to the frame, and a power mechanism for transmission of power from the rider to the wheel. A cycle seat is provided as previously described.

Accordingly, it is an object of the present invention to provide an improved cycle seat for supporting a rider which increases the freedom of the rider's sacroiliac joint to function normally.

It is a further object of the present invention to provide an improved cycle having a seat for supporting a rider which enhances the circulation of CSF through the rider's neurological anatomy to increase strength and stamina.

BRIEF DESCRIPTION OF THE DRAWINGS

These and other inventive features, advantages, and objects will appear from the following Detailed Description of The Preferred Embodiments when considered in connection with the accompanying drawings in which similar reference characters denote similar elements throughout the several views and wherein:

FIG. 1 is a schematic perspective view of a rider on a bicycle including a cycle seat according to the present invention;

FIG. 2 is a schematic representation of a rider's pelvic structure supported by the cycle seat of FIG. 1;

FIG. 3 is a rear view in partial cross section of the cycle seat of FIG. 1;

FIG. 4 is a fragmentary side view in partial cross section illustrating a roller bearing support member of the cycle seat of FIG. 1; and FIG. 5 is a cross sectional view of the roller bearing of FIG. 4 taken along line 5—5 FIG. 4; and FIG. 6 is a fragmentary plan view of the roller bearing, particularly illustrating the pin and the spaced apart stops.

DETAILED DESCRIPTION OF THE PREFERRED EMBODIMENTS

Referring to the drawings in greater detail, FIGS. 1 and 2 show a cycle seat 20 having a support stem 22, roller bearing support member 24, a support arm 26, a pair of pivot joints 28, and a pair of seat members 30. The cycle seat 20 is mounted on a bicycle 32 or other transportation apparatus to support a rider 34 during operation of the bicycle 32.

The bicycle 32 includes a substantially rigid frame 36 with a substantially upright post 38 to which the support stem 22 is connected. A pair of wheels 40, 42 are rotatably mounted on the frame 36, and a power mechanism 44, preferably a conventional peddle, sprocket, and chain assembly, is operatively mounted on the frame 36. The power mechanism 44 is also operatively coupled with at least one of the wheels, preferably the rear wheel 40, for transmission of power from the rider 34 to the wheel 40. The bicycle also has a steering mechanism 46 operatively coupled with the frame 36 and the front wheel 42 to direct the bicycle. The cycle seat 20 is located to support the rider 34 in a position from which the rider can operate the power mechanism and the steering mechanism.

Referring to FIGS. 1 and 3, the support stem 22 is preferably cylindrical and is sufficiently rigid to support the rider without appreciable deformation. The stem 22 is elongated between an upper end 48 and a lower end 50 received in the upright post 38 of the frame 36. The stem 22 is configured and sized to slidably connect with the upright post 38 of the frame 36 to adjust for riders of varying height.

Referring to FIGS. 4 and 5, the roller bearing support member 24 has an outer bearing ring 52, an inner bearing ring 54, a plurality of roller bearings 56, and a core 58. The outer bearing ring is fixably attached to the upper end 48 of the stem 22, and the roller bearings 56 separate the inner ring 54 from the outer ring 52 to permit relative rotation of the concentrically oriented outer and inner rings 52, 54. The core 58 is rotationally fixed to and inside the inner bearing ring 54, and the core 58 defines a support arm receiving aperture 60 through which the support arm 26 extends whereby the support arm 26 is joined to the support stem 22. Thus, the roller bearing support member 24 allows the support arm and connected seat members 30 to pivot about a substantially lateral axis Y illustrated in FIGS. 3 and 5.

Referring to FIGS. 4 and 6, a pair of spaced apart stops 62, 64 are attached to the outer bearing ring 52 near the top thereof, and a stop pin 66 is attached to the inner bearing ring 54. The stop pin 66 extends outwardly in a generally radial direction from the inner ring 54 to a position between the spaced apart stops 62, 64. As the inner ring 54 rotates in the outer ring 52, the stop pin 66 moves back and forth between the stops 62, 64, and the stops operate to limit the range of motion of the inner ring 54, core 58, and support arm 26 which passes through the core. Preferably, the support arm 26 and connected seat members pivot through an angle a of approximately 60° from a substantially horizontal position to a position where the top surface 65 of the seat members are facing the steering mechanism 46.

Referring to FIGS. 4 and 5, a pivot pin 68 pivotally connects the support arm 26 inside the support arm aperture 60, and the support arm aperture 60 is sized larger than the width of the support arm to allow the support arm to pivot about the pivot pin 68. The support arm preferably pivots through an angle β of less than approximately 5°. Preferably, the support arm 26 pivots approximately 2° to either side of its central position, so that β is preferably approximately 4°. Thus, the support arm 26 and connected seat members 30 pivot about a substantially upright axis X illustrated in FIGS. 3 and 5.

Referring to FIGS. 1 and 3, the support arm 26 extends laterally from the opposite sides of the support member 24 and is preferably joined to the stem 22 by the support member 24. The support arm is preferably flexible, so that it deforms elastically along its length under the weight of the rider. Each side of the support arm flexes independently under the weight of the rider. When the full body weight of the rider is applied to one of the seat members, the support arm allows the seat member to flex downwardly by angle γ of approximately 10°. When three times the body weight of the user is applied to one of the seat members, the support arm allows the seat member to flex downwardly by angle δ of less than approximately 20°. Thus, the support arm allows the seat member to pivot about a depth axis Z, and the seat 20 cushions the rider from impact loads that occur during riding.

The first and second pivot joints 28 each include a pivot block 70 slidably mounted on the support arm for movement along the length of the support arm. The pivot blocks 70 are positioned on opposite sides of the support member 24 and slide to adjust for different sizes of riders. Set screws 80 extend through bottoms of the pivot blocks 70 and impinge on the support arm 26 to fix the pivot blocks 70 and attached seat members 30 in place. Thus, the seat members 30 can be positioned to support the ischial tuberosities F, G of almost any rider 34. The pivot blocks define substantially spherical sockets 72, and substantially spherical pivot balls 74 are received in the sockets 72 to form ball and socket pivot joints.

The first and second seat members 30 are connected to the pivot balls 74 by connection rods 76 and mounting plates 78. The connection rods 76 extend upwardly from the balls 74 and of the sockets 72 and connect to bottom sides of the mounting plates 78 which in turn connect to the bottoms of the seat members 30. Thus, the pivot joints allow the seat members to pivot in any direction relative to the pivot blocks 70. Therefore, because of the pivot joint 28, each of the seat members 30 pivots about a respective set of upright, lateral and depth axes X',Y',Z' or X",Y",Z" (e.g., see FIG. 3). Preferably, the pivot joints each limit the corresponding seat member 30 to approximately 2° pivoting movement about the lateral and depth axes Y',Z' or Y",Z". As perhaps best shown in FIG. 3, the depth axes Z' and Z" are parallel with one another and with the depth axis Z about which the support arm 26 flexes. Preferably, the depth axes Z' and Z" are spaced equally from the depth axis Z. The upright axes X' and X" are normally parallel with one another (e.g., when the support arm 26 is not flexed as shown in FIG. 3), as well as with the upright axis X about which the support arm 26 swings. The same may be said of the interrelationship of the lateral axes Y' and Y" and their relationship with the lateral axis Y about which the support arm 26 rotates. Again, each of the seat members 30 is supported for pivoting movement in any direction about the respective axes X',Y',Z' or X",Y", Z". Furthermore, as a result of being supported on the support arm 26, the seat members 30 are also moveable about the axes X,Y,Z.

The first and second seat members 30 are preferably circular and are positioned on opposite sides of the support member. The seat members include the upper surface 65 which is concave for engaging the ischial tuberosities of the rider. The upper surface includes curvature ε of approximately 30° with a radius of curvature of less than approximately 7 inches and preferably approximately 6.75 inches. The seat members 30 can be padded for additional comfort. The seat members are preferably biased in the horizontal position. This accomplished by weighting the seat members or by attaching a resilient member to the seat members.

In the present invention, forces are transmitted from the cycle seat 20 to the most appropriate pelvic structure, the ischial tuberosities F, G. Thus, the rider is sitting on the part of the pelvic structure designed best for sitting. The seat 20 avoids placing pressure on sensitive nerves and tissue and minimizes pressures on the muscles utilized in cycling. The optimal range of movement in the sacroiliac joint is preserved, and CSF flow through the rider's neurological anatomy is uninhibited and even enhanced, thereby optimizing endurance, stamina, and all around performance.

Thus, a cycle seat is disclosed which utilizes pivot joints, a roller bearing support member, and a pivoting, flexible support arm to support a rider while allowing the seat members to pivot in any direction by way of two pivot mechanisms. While preferred embodiments and particular applications of this invention have been shown and described, it is apparent to those skilled in the art that many other modifications and applications of this invention are possible without departing from the inventive concepts herein. For example, the bifurcated seat members could be joined into a single seat member with independently pivoting halves. It is, therefore, to be understood that, within the scope of the appended claims, this invention may be practiced otherwise than as specifically described, and the invention is not to be restricted except in the spirit of the appended claims. Though some of the features of the invention may be claimed in dependency, each feature has merit if used independently.

What is claimed is:

1. A cycle seat for supporting a rider while allowing for proper range of motion of the rider's sacroiliac joint to maintain desired CSF circulation through the rider's neurological anatomy, the seat comprising:

a rigid support stem having a lower end and an upper end;

a laterally extending support arm joined to the upper end of the support stem;

at least one seat member connected to the support arm; and a pivot joint connecting the support arm and the at least one seat member, said pivot joint being configured to support the at least one seat member for pivoting movement about a first generally laterally extending lateral axis, a first generally vertically extending upright axis, and a first generally fore and aft extending depth axis, said pivot joint further being configured to at least substantially equally limit pivoting movement of the at least one seat member about the first lateral and depth axes.

2. The seat according to claim 1 further comprising a support member attached to the upper end of the stem and having the support arm attached thereto whereby the support arm is joined to the upper end of the support stem.

3. The seat according to claim 1 further comprising another seat member connected to the support arm, and wherein the seat members are positioned on opposite sides of the support stem, and the seat members are slidably connected to the support arm allowing the seat members to slid along a length of the support arm whereby the seat is adjusted for different sized riders.

4. A cycle seat for supporting a rider while allowing for proper range of motion of the rider's sacroiliac joint to maintain desired CSF circulation through the rider's neurological anatomy, the seat comprising:

a rigid support stem having a lower end and an upper end;

a laterally extending support arm joined to the upper end of the support stem;

at least one seat member connected to the support arm;

a pivot joint connecting the support arm and the at least one seat member, said pivot joint being configured to support the at least one seat member for pivoting movement about a first generally laterally extending lateral axis, a first generally vertically extending upright axis, and a first generally fore and aft extending depth axis; and a support member attached to the upper end of the stem and having the support arm attached thereto whereby the support arm is joined to the upper end of the support stem, said support member comprising a roller bearing allowing the support arm and attached seat member to pivot about a second generally laterally extending lateral axis.

5. The seat according to claim 4 wherein the support member includes an outer bearing ring having a pair of spaced apart stops, and an inner bearing ring having a stop pin extending radially outwardly from the inner bearing ring to a position between the spaced apart stops.

6. The seat according to claim 5 wherein the stops are spaced apart to allow approximately 60° of pivot of the support arm about the second lateral axis.

7. A cycle seat for supporting a rider while allowing for proper range of motion of the rider's sacroiliac joint to maintain desired CSF circulation through the rider's neurological anatomy, the seat comprising:

a rigid support stem having a lower end and an upper end;

a laterally extending support arm joined to the upper end of the support stem;

at least one seat member connected to the support arm; and a pivot joint connecting the support arm and the at least one seat member, said pivot joint being configured to support the at least one seat member for pivoting movement about a first generally laterally extending lateral axis, a first generally vertically extending upright axis, and a first generally fore and aft extending depth axis, said support arm comprising an elongated support bar having a length and a width, and the support arm being flexible along its length to permit elastic deformation less than approximately 20°.

8. A cycle seat for supporting a rider while allowing for proper range of motion of the rider's sacroiliac joint to maintain desired CSF circulation through the rider's neurological anatomy, the seat comprising:

a rigid support stem having a lower end and an upper end;

a laterally extending support arm joined to the upper end of the support stem;

at least one seat member connected to the support arm;

a pivot joint connecting the support arm and the at least one seat member, said pivot joint being configured to support the at least one seat member for pivoting movement about a first generally laterally extending lateral axis, a first generally vertically extending upright axis, and a first generally fore and aft extending depth axis; and a support member attached to the upper end of the stem, and wherein the support member defines a support arm receiving aperture having the support arm extending therethrough, and further comprising a pivot pin pivotally connecting the support arm to the support member in the support arm receiving aperture, and the support arm receiving aperture being sized larger than a width of the support arm allowing the support arm to pivot about a second generally vertically extending upright axis.

9. The seat according to claim 8 wherein the support arm pivots less than approximately 5° about the second upright axis.

10. A seat for supporting a rider on the rider's ischial tuberosities while allowing for proper range of motion of the rider's sacroiliac joint to maintain desired CSF circulation through the rider's neurological anatomy, the seat comprising:

a rigid support stem having a lower end and an upper end;

a laterally extending support arm joined to the upper end of the support stem;

a first seat member connected to the support arm on one side of the stem;

a second seat member connected to the support arm on an opposite side of the stem;

a first pivot joint connecting the support arm and the first seat member, and a said first pivot joint being configured to support the first seat member for pivoting movement about a first generally laterally extending lateral axis, a first generally vertically extending upright axis, and a first generally fore and aft extending depth axis, said first pivot joint further being configured to at least substantially equally limit pivoting movement of the first seat member about the first lateral and depth axes; and a second pivot joint connecting the support arm and the second seat member, said second pivot joint being configured to support the second seat member for pivoting movement about a second generally laterally extending lateral axis, a second generally vertically extending upright axis and a second generally fore and aft extending depth axis, said second pivot joint further being configured to at least substantially equally limit pivoting movement of the second seat member about the second lateral and depth axes.

11. The seat according to claim 10 wherein the first and second seat members comprise approximately 30° of curvature with a radius of less than approximately 7 inches.

12. The seat according to claim 10 wherein each of the pivot joints comprises a ball and socket joint.

13. A seat for supporting a rider on the rider's ischial tuberosities while allowing for proper range of motion of the rider's sacroiliac joint to maintain desired CSF circulation through the rider's neurological anatomy, the seat comprising:

a rigid support stem having a lower end and an upper end;

a laterally extending support arm joined to the upper end of the support stem;

a first seat member connected to the support arm on one side of the stem;

a second seat member connected to the support arm on an opposite side of the stem;

a first pivot joint connecting the support arm and the first seat member, said first pivot joint being configured to support the first seat member for pivoting movement about a first generally laterally extending lateral axis, a first generally vertically extending upright axis, and a first generally fore and aft extending depth axis;

a second pivot joint connecting the support arm and the second seat member, said second pivot joint being configured to support the second seat member for pivoting movement about a second generally laterally extending lateral axis, a second generally vertically extending upright axis, and a second generally fore and aft extending depth axis;

a support member including an outer bearing ring attached to the stem, an inner bearing ring rotatably held within the outer bearing ring, a plurality of roller bearings separating the inner bearing ring from the outer bearing ring, a core defining a support arm receiving aperture having the support arm received therein, and the support member allowing the support arm to pivot about a third generally laterally extending lateral axis; and a pivot pin pivotally connecting the support arm in the support arm receiving aperture, and the support arm receiving aperture being sized to permit the support arm to pivot in the support arm receiving aperture about a third generally vertically extending upright axis.

14. A cycle for use by a rider, the cycle comprising:

a substantially rigid frame;

at least one wheel rotatably mounted to the frame;

a power mechanism operatively coupled with the at least one wheel for the transmission of power from the rider to the wheel; and a cycle seat mounted on the frame for supporting a rider in position to operate the power mechanism, the cycle seat including:

a rigid support stem having a lower end and an upper end;

a laterally extending support arm joined to the upper end of the support stem;

at least one seat member connected to the support arm; and a pivot joint connecting the support arm and the at least one seat member, said pivot joint being configured to support the at least one seat member for pivoting movement about a first generally laterally extending lateral axis, a first generally vertically extending upright axis, and a first generally fore and aft extending depth axis, said pivot joint further being configured to at least substantially equally limit pivoting movement of the at least one seat member about the first lateral and depth axes.

15. The cycle according to claim 14 further comprising a steering mechanism operatively coupled with the frame for directing the cycle, and another wheel rotatably mounted to the frame and operatively coupled with the steering mechanism for directing the cycle.

16. The cycle according to claim 14 wherein the pivot joint comprises a ball and socket joint.

17. The cycle according to claim 16 further comprising another seat member and another pivot joint pivotally connecting the other seat member to the support arm at a position spaced laterally from the first-mentioned seat member.

18. A cycle for use by a rider, the cycle comprising:
- a substantially rigid frame;
- at least one wheel rotatable mounted to the frame;
- a power mechanism operatively coupled with the at least one wheel for the transmission of power from the rider to the wheel; and
- a cycle seat mounted on the frame for supporting a rider in position to operate the power mechanism, the cycle seat including:
  - a rigid support stem having a lower end and an upper end;
  - a laterally extending support arm joined to the upper end of the support stem;
  - at least one seat member connected to the support arm;
  - a pivot joint connecting the support arm and the at least one seat member, said pivot joint being configured to support the at least one seat member for pivoting movement about a first generally laterally extending lateral axis, a first generally vertically extending upright axis, and a first generally fore and aft extending depth axis; and
  - a roller bearing support member attached to the upper end of the stem, and wherein the support arm is attached to the support member whereby the support arm is joined to the stem, and the support arm pivoting through approximately 60° about a second generally laterally extending lateral axis.

19. The cycle according to claim 18 further comprising a pivot pin pivotally connecting the support arm to the support member, and the support arm pivoting through approximately 4° about a second generally vertically extending upright axis.

* * * * *